E. RIVETT.
BEARING FOR GRINDING APPARATUS.
APPLICATION FILED MAR. 23, 1907.
913,767.
Patented Mar. 2, 1909.
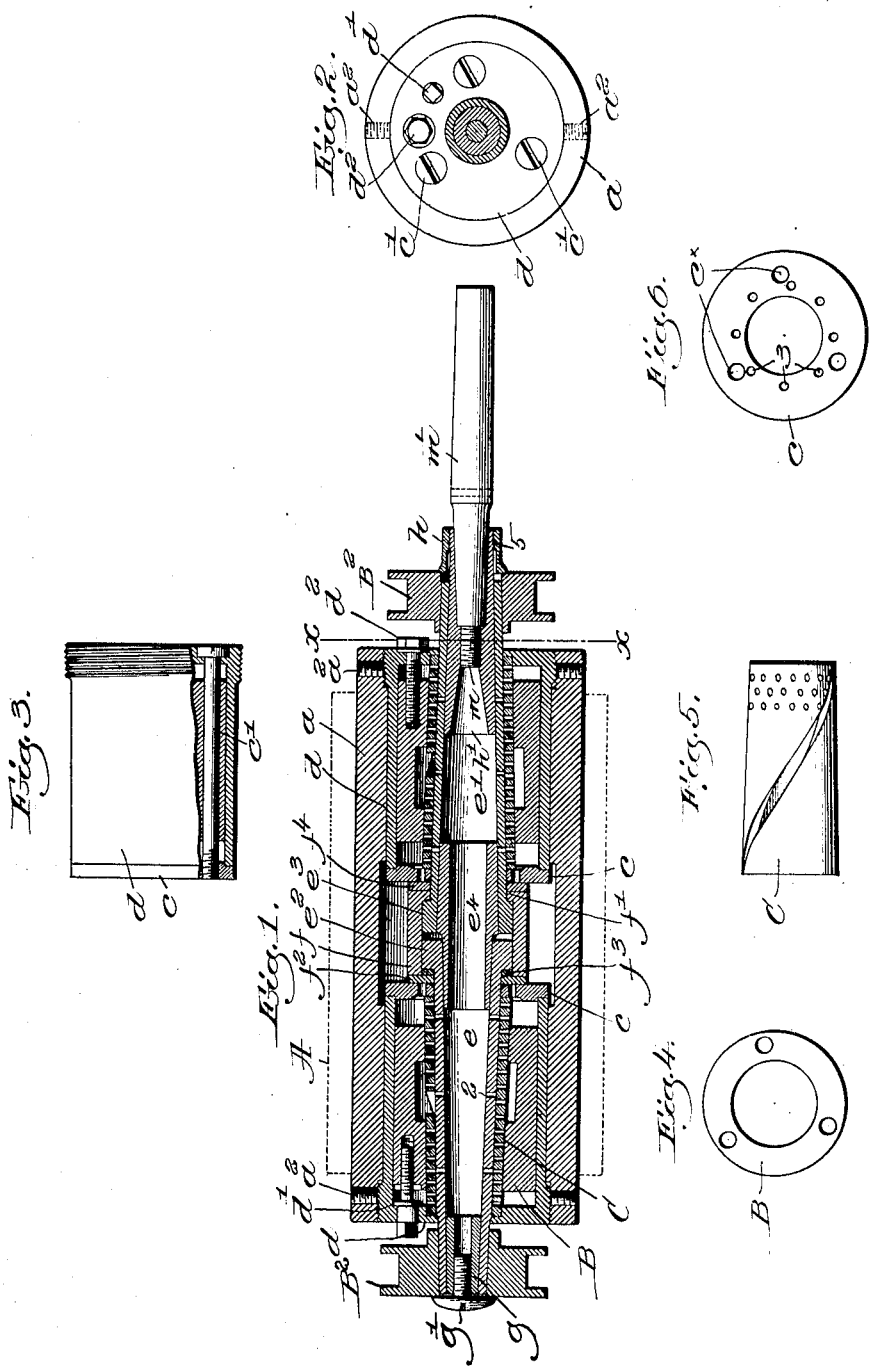

UNITED STATES PATENT OFFICE.

EDWARD RIVETT, OF BOSTON, MASSACHUSETTS.

BEARING FOR GRINDING APPARATUS.

No. 913,767.   Specification of Letters Patent.   Patented March 2, 1909.

Application filed March 23, 1907. Serial No. 364,063.

*To all whom it may concern:*

Be it known that I, EDWARD RIVETT, a citizen of the United States, residing in Boston, county of Suffolk, and State of Massachusetts, have invented an Improvement in Bearings for Grinding Apparatus, of which the following description, in connection with the accompanying drawing, is a specification, like characters on the drawing representing like parts.

This invention has for its object to improve the type of grinding machine represented in United States Patent No. 652,007, granted to me and dated June 19, 1901, the improvement tending to insure greater steadiness of rotation of the tool carrier, and consequently greater accuracy in grinding work to be acted upon by the tools.

In the patent referred to the spindle was substantially cylindrical at each side of a central fixed collar, and a compressible box slitted inwardly from its opposite ends fitted the same at each side of said collar, the exterior of the slitted box being acted upon by the straight sides of wedges guided in and carried by holders inclosed in sleeves fixed within the opposite ends of a quill, the adjustment longitudinally of the holders in the sleeves causing the latter in their movement in said sleeves to act on the tapered outer sides of the wedges which were restrained against longitudinal movement, causing the wedges to contact with the slotted box to hug more closely the spindle to thereby take up any wear and insure accuracy of work.

In my present invention I have devised a hollow multipart spindle comprising essentially two conical sleeves or shells and a means for connecting and holding the ends of the same together firmly.

Figure 1 in longitudinal section shows a grinding apparatus embodying my invention; Fig. 2 is a section looking to the left of the dotted line $x$, Fig. 1; Fig. 3 shows one of the sleeves detached and partially broken out to illustrate the bearing holder therein, the holder being partially broken out to show one of the screws extended therethrough to confine the plate closing the inner end of the sleeve; Fig. 4 shows an end view of the bearing holder; Fig. 5 shows the bearing detached, and Fig. 6 shows one of the plates $c$ detached.

Referring to the drawing, A in dotted lines shows part of a bearing or head in which is sustained a quill $a$ common to said patent, said quill at its opposite ends receiving sleeves $d$ provided one with a right and the other with a left thread to be screwed into the ends of the quill, the sleeves being held in place in the quill by set screws $a^2$, all as in said patent.

I will now describe the novel features of my present invention to be hereinafter claimed.

Within each sleeve I insert a bearing holder B shown detached in Fig. 4, the same being cylindrical externally to fit the interior of the sleeve, see Fig. 1, and provided with a tapered hole, the hole being smaller nearest the ends of the quill. In the hole in the bearing holder I insert an anti-friction bearing C having a series of holes for the passage of and for holding any lubricating material, said bearing being herein represented as having a spiral slit from one to its opposite end that it may, by pressure exerted on its outside, be contracted. After inserting the bearing holder and bearing in the sleeve, I apply to the open inner end of each sleeve a circular plate $c$ having a series of oil holes 3, and other screw threaded holes $c^\times$, see Fig. 6.

I insert through holes in the outer ends of the heads of the sleeves a plurality of screws $c'$, said screws passing loosely through holes in the bearing holder and having their screw threaded ends threaded for a short distance into threaded holes of the plates $c$, the latter plates contacting with the inner ends of the bearing holders, the outer ends thereof contacting with the inner sides of the heads of the sleeves. The outer end of each sleeve carries two screws $d'$ $d^2$, both being shown in elevation in Fig. 1. Each screw $d'$ has a collar that contacts with the inner side of the head of the sleeve, see left of Fig. 1, the head being extended outwardly through a hole in the head of the sleeve to be engaged by a wrench, and the threaded part of the screw enters a threaded hole in the holder, the rotation of said screw causing the holder to be moved longitudinally into the sleeve. The screws $d^2$ are merely holding or stop screws that are turned in after adjusting a holder by turning a screw $d'$.

Instead of using a solid spindle as in my said patent, I have made a multipart hollow spindle which, as shown, comprises two hollow sleeves $e$, $e'$ having respectively at their inner ends flanges $e^2$, $e^3$. The sleeves are tapered externally and internally, see Fig. 1, and provided with oil holes 2, the inner ends of the hollow sleeves being united by a bushing $e^4$ tapered externally at its opposite ends, to enter and fit the internal taper at the inner ends of said hollow sleeves, the opposite ends of said bushing being shown as of different diameter. After the parts $e$ and $e^4$ of the spindle have been forced firmly in contact, as in Fig. 1, I slip onto the end of the right hand sleeve, see Fig. 1, a ring $f$ having at one end an inturned flange $f'$ that abuts the outer side of the flange $e^3$ while the opposite end of said ring overlaps the flange $e^2$ and abuts an anti-friction washer $f^2$ that contacts with the inner side of the left hand sleeve, Fig. 1, a second washer $f^3$ which may be of metal being interposed between the head $e^2$ and the anti-friction washer $f^2$. The right hand hollow sleeve is surrounded by an anti-friction washer $f^4$ that is interposed between the plate closing the inner end of the right hand holder and the flanged end of the ring $f$.

The outer end of the left hand hollow sleeve $e$ has driven into it from its inner and larger end an externally tapered bushing $g$ screw threaded internally, and the outer end of said hollow sleeve is tapered to receive over it, when extended beyond the sleeve $d$ the internally tapered hub of a driven pulley $B^2$ designated by like letter in said patent, it being understood that the tapered outer ends of both said hollow sleeves when protruded from the sleeves and beyond the end of the quill, will be provided with a pulley as $B^2$ so that two belts, one on each of said pulleys, may drive the spindle in the bearings at an excessively high speed, twenty-five to seventy-five thousand per minute without any unsteadiness.

The pulley $B^2$ at the left in Fig. 1 is forced onto the tapered end of sleeve $e$ by the head of a screw $g'$ as the threaded shank of said screw is screwed into the threaded hole of the bushing $g$. The pulley $B^2$ at the right of Fig. 1 has an internally tapered hole in its hub slipped over the tapered outer end of the right hand sleeve, and is forced thereon to a snug driving fit by a threaded ring $h$ screwed onto a threaded portion 5 of the outer end of a bushing $h'$ tapered externally and forced into said right hand sleeve from its inner end, the externally tapered end of said bushing fitting the interior tapered wall of said sleeve, the smaller end of the bushing being forced beyond the outer end of the sleeve, see Fig. 1. The bushing is provided internally with screw threads entered by the screw threaded shank $m$ of the tool holding part or extension $m'$ of the spindle.

In assembling the parts, the sleeve at the left of Fig. 1 with its holder, bearing, and plate may be inserted into the quill from its left hand end, and the left hand end of the hollow spindle with its washers, ring $f$ and tool holder $m'$ but without the pulley $B^2$ may be inserted into the right hand end of the quill until the washer $f^3$ meets the anti-friction washer, and thereafter the sleeve at the right, Fig. 1, with its contained parts will be screwed into the quill until the plate at its end contacts with the anti-friction washer $f^4$. After this the pulley $B^2$ will be applied to the end of the spindle.

The quill and its entire contents may be removed from the head A, as an entirety, as provided for in said patent.

Oil or other lubricant filled into the quill when assembling the parts will pass through the holes in the plates $c$, through holes in the bearings and entering the hollow spindle will keep the spindle highly lubricated.

If the bearings or spindle wear, by turning the screws $d'$, $d^2$ the holders may be adjusted toward the ring $f$ and in so doing will compress the bearings causing the same to fit the exterior of the spindle snugly so that there can be no lost motion or jar.

The apparatus herein shown may be used as and for the purposes fully described in said patent.

Having described my invention, what I claim as new and desire to secure by Letters Patent is:—

1. In an apparatus of the class described, a rotary multi-part spindle comprising a plurality of hollow externally tapered sleeves, a bushing having tapered ends engaging the inner ends of and connecting said sleeves, and bearings embracing the exterior of said sleeves and in which the spindle rotates.

2. A multipart spindle comprising a plurality of hollow externally tapered sleeves, and means for connecting said sleeves at their inner ends, combined with bearings embracing the exterior of said sleeves, and means for sustaining said bearings.

3. A multipart spindle comprising a plurality of hollow externally tapered sleeves, means for connecting said sleeves at their inner ends, and an exteriorly tapered bushing projected beyond the smaller end of one of said sleeves.

4. A multipart spindle comprising a plurality of hollow externally tapered sleeves, means for connecting said sleeves at their inner ends, and an exteriorly tapered bushing projected beyond the smaller end of one of said sleeves, combined with a pulley applied to the outer end of said sleeve and means applied to said bushing for forcing said pulley onto the tapered end of said sleeve.

5. A multipart spindle comprising a plurality of hollow externally tapered sleeves, means for connecting said sleeves at their inner ends, and an exteriorly tapered bushing projected beyond the smaller end of one of said sleeves, combined with a pulley applied to the outer end of said sleeve, means applied to said bushing for forcing said pulley onto the tapered end of said sleeve, and a tool holder carried by said bushing and revoluble with said spindle.

6. A quill, two sleeves applied to the outer ends of said quill, a bearing holder, and a tapered bearing applied inside each sleeve, a plate at the inner end of each sleeve, a multipart hollow spindle tapered externally, means to connect a plate to each sleeve, and means to adjust said bearing holders longitudinally in said sleeves over said bearings.

7. A quill, two sleeves applied to the outer ends of said quill, a bearing holder, and a tapered bearing applied inside each sleeve, a plate at the inner end of each sleeve, a multipart hollow spindle tapered externally, means to connect a plate to each sleeve, means to adjust said bearing holders longitudinally in said sleeves over said bearings, two pulleys mounted on said spindle, and a ring, the latter being rotatable in the space between the plates closing the inner ends of said sleeves.

In testimony whereof, I have signed my name to this specification, in the presence of two subscribing witnesses.

EDWARD RIVETT.

Witnesses:
   GEO. W. GREGORY,
   EVANGELINE C. BROWN.